Dec. 19, 1967  G. E. BURNHAM, SR  3,358,425
DEGASSING APPARATUS
Filed June 14, 1966  2 Sheets-Sheet 1

INVENTOR
Gerald E. Burnham, Sr.

BY *Irons, Birch, Swindler & McKie*
ATTORNEYS

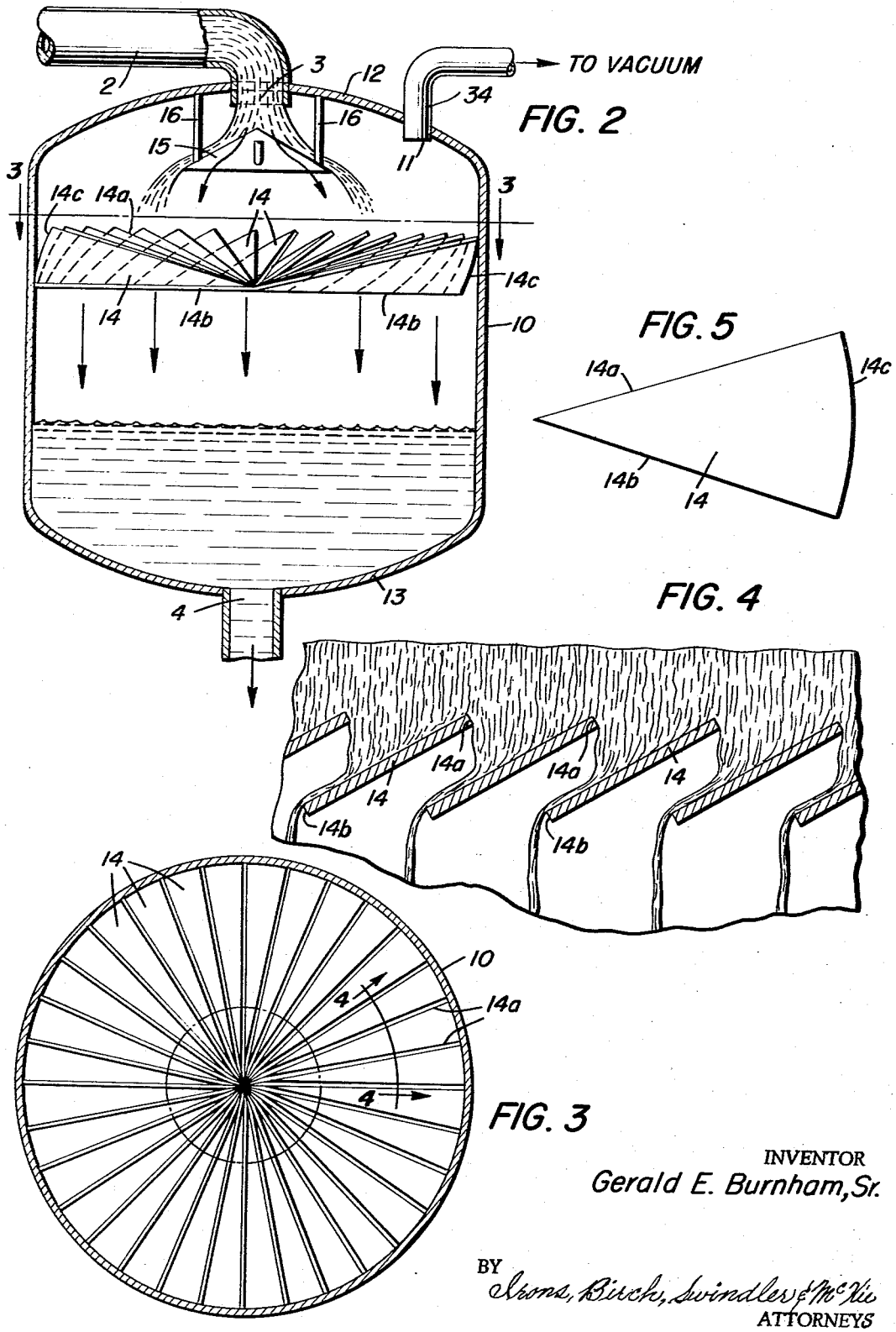

United States Patent Office 3,358,425
Patented Dec. 19, 1967

3,358,425
DEGASSING APPARATUS
Gerald E. Burnham, Sr., 2000 W. St. Mary Blvd.,
Lafayette, La. 70501
Filed June 14, 1966, Ser. No. 557,449
11 Claims. (Cl. 55—193)

ABSTRACT OF THE DISCLOSURE

Apparatus adapted for the reconditioning of drilling muds including a baffle arrangement for directing the mud to be degassed into radial, descending, relatively thin liquid curtains to facilitate removal of entrapped air from the mud. This baffle arrangement is employed with a means of disposing the mud on the baffles and a vacuum source to effect the removal of gas from the mud.

The jet nozzle and circulating carrier liquid type of vacuum source includes a gas removal system.

---

This invention relates to apparatus for degassing fluids, more particularly, to degassing apparatus which forms a fluid to be degassed into a plurality of thin curtains which are subjected to a vacuum to remove gas contained therein, and to a vacuum source having improved operating characteristics and which is especially well suited for use with such degassing apparatus.

The degassing of fluids, i.e. the removal of gases entrapped within fluids, is a problem which exists in many industries. The degassing problem is continuously encountered when drilling wells for gas or oil, since it is customary to circulate drilling mud through the well and around the drill during the drilling operation. The drilling mud is ordinarily an aqueous suspension of solid matter, although plain oil may also be used. The drilling mud performs several well recognized functions, such as lubricating and cooling the drill bit and stem and serving as a carrier to withdraw drill cuttings and sand from the well and to carry them to the surface for removal. A very important function of the fluid is that of preventing escape of gases from the well. During drilling, the drill penetrates numerous formations, some of which may contain gases under very high pressure which tend to enter the well. The drilling fluid, however, exerts a hydrostatic pressure at any point in the well, proportional to the height and the density of the fluid column. The pressure exerted by the column of drilling fluid counteracts the gas pressure. However, as gas becomes entrapped in the fluid, the density of the drilling mud decreases.

For efficiency in operation, the drilling fluid is continuously recirculated to perform the foregoing functions. The recirculation results in the drilling fluid's carrying progressively increased amounts of solids and entrapped gases. The increasing gas content progressively decreases the density of the drilling fluid, an effect known as gas cutting, rendering the drilling fluid unsuitable for further use. The gas-cut drilling fluid becomes ineffective both as a carrier for solid matter and as a counteractant to gas pressure encountered in the drilling. It is therefore essential that the gas-cut drilling fluid be effectively degassed prior to its subsequent use.

Numerous systems have been proposed in the prior art for effecting degassing of fluids, such as drilling muds. Many of the prior art degassing devices utilize vacuum tanks containing various structures for spreading out or breaking up the fluid to increase the ratio of surface area to volume of the fluid during its exposure to a vacuum to effect the release of entrapped gases. In general, however, these structures have not been entirely satisfactory. Many of the prior art structures do not effect a sufficient dispersion or spreading out of the fluid, whereby an insufficient area to volume ratio of the fluid is attained. As a result, the entrapped gases are not removed to a sufficient degree and the fluid density progressively lessens. Many other prior art devices are unduly complex and expensive and contain a number of moving parts which are subject to mechanical failure. Still others of the prior art devices are subject to clogging and/or are difficult to clean.

These and other shortcomings of prior art systems are overcome by the degassing apparatus of the invention.

The degassing apparatus of the invention also includes, in addition to a unique structure for effecting spreading of the fluid for exposure to vacuum to effect the degassing, a vacuum source having improved operating characteristics rendering it particularly advantageous for use with a degassing system.

Many prior art vacuum sources employ a pump which is connected directly to a vacuum tank for creating a reduced pressure within the tank, and thereby to remove gas entrapped in the fluid within the tank. Such entrapped gas, when removed, is frequently very moist and, as a result, causes undesirably rapid wear and deterioration of the pump. As a result, degassing systems employing such prior art types of degassing pumps are expensive to operate due both to the expense of repairing the vacuum pump and to the necessary shut-down of the degassing system during pump repair. These factors result in inefficiency in the operation of the degassing system.

These and other shortcomings of prior art vacuum sources are overcome by the vacuum source of the invention.

It is therefore an object of this invention to provide an improved apparatus for degassing fluids.

It is a further object of this invention to provide an apparatus for degassing fluids which is simple in construction and inexpensive in costs both of construction and of maintenance.

Another object of this invention is to provide an improved vacuum pump of simple and inexpensive construction.

Still another object of this invention is to provide an improved vacuum pump for use with apparatus for degassing fluids wherein the pump is not affected by moisture carried by gases removed from the fluids.

In accordance with a preferred embodiment of the invention, the degassing apparatus includes a generally cylindrical tank having a vertical axis and which is closed at both ends. A plurality of baffle plates, each preferably of generally triangular configuration and having an upper and a lower edge, is mounted within the tank. The baffle plates extend radially from the axis with the lower edge of each plate preferably in a common plane transverse to the axis of the cylindrical tank. A cone-shaped distributing member is mounted coaxially within the tank with the apex of the distributing member disposed toward, and adjacent to, a downwardly, axially directed fluid inlet means at the top of the tank. The incoming fluid to be degassed passes along the surface of the cone-shaped member and is spread into an annular stream of fluid which falls by gravity from the lower, circular periphery of the distributing member onto the baffle plates. The baffle plates are inclined relative to the horizontal and are disposed in spaced, overlapping relationship, whereby the annular stream of fluid is received on the baffle plates. The fluid received on each baffle plate spreads into a thin stream which flows down the baffle plate, by gravity, and toward the lower edge thereof. The fluid falls by gravity from the lower edge of each baffle plate in a thin curtain. The plurality of baffle plates form a plurality of radial curtains of fluid each having a high surface to volume ratio, whereby entrapped gases are readily removed from the fluid by the reduced pressure within the vacuum tank.

The degassed fluid is collected in the bottom of the tank, from which it is removed for recirculation to a well or other use. The vacuum source comprises a pump which produces a flow of a carrier fluid, which conveniently may be water. A nozzle housing including a chamber and a nozzle is connected to the pump to receive the flow of carrier fluid, the nozzle projecting a jet of carrier fluid through the chamber. The jet creates a reduced pressure within the chamber transversely of its direction of flow. A conduit communicates with the chamber and provides for connection to the vacuum tank to apply the vacuum or reduced pressure within the chamber to the vacuum tank. Gases removed from the fluid within the vacuum tank pass through the conduit and are entrapped in the carrier fluid of the jet and pass, with the carrier fluid, through a return conduit to a reservoir. The gases are released from the carrier fluid as it passes into the reservoir, and the carrier fluid is recirculated by the pump.

For a better understanding of the invention, reference may be had to the following detailed description and drawings, in which:

FIG. 2 is a vertical sectional view of a vacuum tank employing the novel fluid spreading elements of the invention;

FIG. 3 is a sectional view taken along line 3—3 of FIG. 2;

FIG. 4 is a sectional view taken along the line 4—4 of FIG. 3 and shows the effect on fluid flow of the novel fluid spreading elements;

FIG. 5 is a detail of a single fluid spreading element in accordance with the invention.

Figure 1:
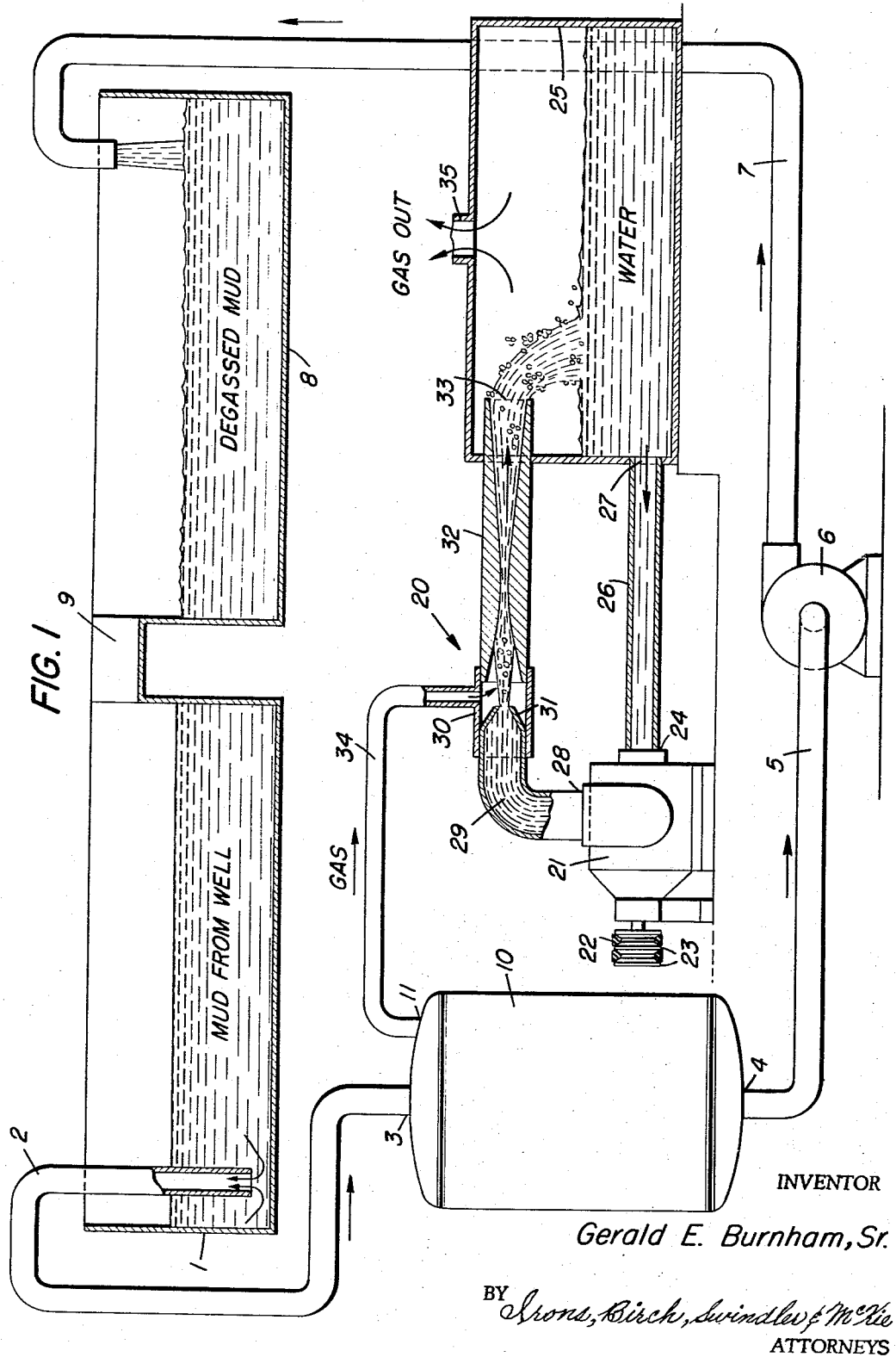
FIG. 1 is a schematic view of the degassing system of the invention and shows the vacuum source of the invention.

FIG. 1 shows a schematic of the degassing system of the invention, including a vacuum tank 10 and a vacuum source 20, the operation of which will be described in detail hereinafter. The fluid to be degassed, such as drilling mud, is deposited in a first mud tank 1, which is part of a standard drilling rig, and the fluid contents of which are labeled "MUD FROM WELL." The drilling mud passes through a conduit 2 having one end disposed below the surface of the drilling mud in the mud tank 1 to the inlet 3 of the vacuum tank 10. The degassed fluid, or drilling mud, thereafter passes from the outlet 4 of the vacuum tank 10 and through a conduit 5 to a pump 6. The pump 6 directs the degassed drilling mud through a conduit 7 for deposit in a second mud tank 8, the contents of which are labeled "DEGASSED MUD." The first and second mud tanks 1 and 8 are connected independently of the degassification system by a mud trough 9 in a conventional manner. As discussed hereinbefore, the degassed mud in the second mud tank 8 is available for recirculation through the drilling apparatus. Thereafter it is recovered and redeposited in the first mud tank 1, whereupon the cycle repeats.

The vacuum source 20 includes a pump 21 which may be a conventional fluid pump. The pump 21 is driven by belts 22 received on the pulleys 23, the belts 22 being driven by a prime mover (not shown). A constant supply of a carrier fluid, such as water, is maintained at the input 24 to the pump 21. Conveniently, the supply of carrier fluid is provided by a reservoir or carrier fluid storage tank 25, the contents of which are labeled "WATER." A conduit 26 connects the outlet 27 of the storage tank 25 with the inlet 24 of the pump 21. The pump 21 operates to receive the water from the storage tank 25 and to create a flow of water at its outlet 28 and through the conduit 29.

The vacuum source 20 further includes a nozzle housing 30 defining a hollow chamber therein and a nozzle 31. The nozzle 31 receives the flow of water within the conduit 29 and projects a jet of water through the chamber of the housing 30. As is well known, the creation of a jet produces a relatively reduced pressure within the chamber in a direction transverse to that of the jet. The jet of water is received by a return conduit 32 and returned to inlet 33 of the storage tank 25. The return conduit 32 preferably has an interior constriction defining a Venturi nozzle to more effectively transmit the fluid of the jet and the gases entrapped therein to the storage tank 25.

Conduit 34 communicates with the chamber of the housing 30 and is disposed along an axis transverse to the direction of the jet, whereby a reduced pressure is created within the conduit 34 in the presence of a jet within the chamber. The conduit 34 is connected at its other end to a vacuum port 11 on the vacuum tank 10, wherein the vacuum source of the invention creates a reduced pressure within the tank 10.

Gas removed from the fluid within the vacuum tank 10 therefore is transported through the conduit 34 and entrapped in the jet of carrier fluid within the chamber of the nozzle housing 30 and carried thereby into the water storage tank 25. This transporting of the removed gases is illustrated by bubbles being entrapped in the jet within the housing 30 and being released from the carrier fluid as it enters the storage tank 25. The storage tank 25 further includes a gas outlet 35 from which the gas carried by the carrier water escapes or is removed. The carrier water therefore is freed of the gas and may be recirculated by the pump 21, as indicated.

The specific construction of the degassing or vacuum tank 10 is best shown in FIGS. 2–5. The tank 10 is in the shape of a vertical cylinder and includes upper and lower end closures 12 and 13. The tank 10 is sealed against inflow or outflow of fluids except through the inlet 3, the outlet 4, and the vacuum duct 11.

The improved apparatus of the invention for spreading the fluid to be degassed comprises a plurality of baffle plates 14. As shown in FIG. 5, each of the baffle plates 14 is of substantially triangular configuration including upper and lower edges 14a and 14b, defining an included angle therebetween, and a generally arcuate edge 14c opposite the included angle.

With reference to FIGS. 2 and 3, the baffle plates 14 extend radially from the axis of the tank 10 with the lower edges 14b thereof lying substantially in a common horizontal plane transverse to and at a predetermined location along the axis, or the vertical height of the tank 10. The baffle plates 14 are equiangularly disposed about the axis of the tank 10 and inclined at a predetermined, common angle relatively to the horizontal. Further, the baffle plates 14 are in slightly overlapping relationship, circumferentially, as best seen in FIG. 4. It will be appreciated that the edge 14c of each baffle plate 14 is not strictly arcuate relative to the vertex of the included angle of the sides 14a and 14b. Rather, the edge 14c is shaped so as to closely engage the interior surface of the vertical, cylindrical wall of the tank 10. Preferably, each plate 14 is secured along its edge 14c to the cylindrical wall and the plurality of plates 14 is secured together adjacent the apex of the sides 14a and 14b to form an integral unit of substantial strength. Any desired means of supporting the plates 14 in the described arrangement may be employed, however.

A cone-shaped distributing element 15 is mounted in coaxial relationship within the tank 10 by means such as a plurality of arms 16 secured to the top end closure 12. The vertex of the cone-shaped distributing element is disposed below and adjacent to the inlet 3 of the tank 10, whereby a fluid to be degassed, when introduced into the tank 10, is received on the distributing element 15. The fluid is distributed evenly and flows along the surface of the distributing element 15 to its lower, generally circular periphery, from which it falls in an annular stream onto the plurality of baffle plates 14.

With reference to FIG. 4 there is shown a portion of the plurality of baffle plates 14 and the spreading effect thereof on an impinging stream of fluid. The annular stream is received on the exposed portion of each baffle plate 14, i.e., the portion not overlapped by an adjacent baffle plate 14, and flows by gravity in a direction from the upper edge 14a to the lower edge 14b of each baffle plate 14. The fluid to be degassed thereafter flows, by gravity, in a thin radial curtain vertically downwardly from the lower edge 14b of each baffle plate 14. The plurality of baffle plates 14 therefore produce a plurality of radial, thin curtains of fluid. The surface to volume ratio of the fluid is thereby greatly increased and facilitates the effectiveness of the vacuum applied to the tank 10 in removing gases entrapped in the fluid. The degassed fluid, or degassed drilling mud, is received in the bottom of the tank 10 and removed through the outlet 4 for recirculation, as hereinbefore described.

In a working embodiment of the degassing apparatus of the invention, the vacuum tank 10 is approximately six feet high in its axial direction and five feet in diameter. The common plane of the baffle plates 14 is located approximately four feet above the bottom of the tank. Each baffle plate 14 is approximately thirty inches in length along its lower edge 14b and about eighteen inches in width, as measured along a vertical line from the lower edge 14b through the maximum distance to the upper edge 14a. The plates 14 are inclined at a preferred angle of approximately 60° relatively to the vertical axis of the tank 10, or 30° relatively to the common, horizontal plane of the lower edges 14b.

It will readily be appreciated by those skilled in the art that the degassing system of the invention is of an uncomplicated and inexpensive construction. The fluid spreading elements produce an extremely effective spreading of the fluid to be degassed into a plurality of thin curtains, providing a very high surface to volume ratio which allows almost all of the entrapped gases to be released. Further, the vacuum source for effecting degassing of the fluid is highly effective in its operation. In addition, both the fluid spreading elements and the vacuum source are very durable and require only a minimum of maintenance, thereby assuring substantially continuous operation of the degassing system with a minimum of lost time for repairs and maintenance.

Numerous modifications of the invention will readily be apparent to those skilled in the art. In particular, it will be obvious that the angle of inclination of the baffle plates is not limited to any critical angle but rather may be established at any of a wide range of angles. The most effective angle of inclination is a function of the viscosity and temperature of the fluid to be degassed and therefore will vary with different applications of the degassing system of the invention. Of course, the baffle plates 14 need not all be at the identical angle of inclination, nor need they be spaced at identical intervals, although adjacent ones should overlap. Further, the size of the baffle plates and the dimensions of the vacuum tank 10 given hereinbefore are illustrative and, likewise, may be varied in accordance with particular circumstances. Although the plurality of baffle plates 14 have been shown in a preferred embodiment having a substantially triangular configuration and the tank having a cylindrical configuration, it will be appreciated that suitable modifications of these configurations may be effected while retaining the benefits of, and without departing from, the invention.

It is therefore intended by the appended claims to cover all such modifications and adaptations as fall within the true spirit and scope of the invention.

What is claimed is:

1. In a system for the degassification of drilling muds, the combination comprising:
    a vacuum tank having a vertical axis;
    means connected to said tank for drawing a vacuum from said tank to effect separation of entrapped gas from the drilling mud;
    baffle means mounted in said tank, said baffle means comprising a plurality of radially disposed baffle plates mounted in said tank, said plates being inclined relative to the horizontal to define upper and lower edges and surfaces, said plates having their respective lower edges circumferentially spaced from each other, each plate having its upper edge vertically spaced from and overlapping the lower edge of its adjacent plate;
    means mounted in said tank for depositing said mud onto the upper surfaces of said plates so that said mud to be degassed flows by gravity down said upper surfaces and falls as a plurality of thin generally radial curtains of mud from the lower edges of said plates.

2. The apparatus of claim 1 wherein the inner ends of said plates meet and are connected together at said axis, and the outer ends of said plates extend to the interior wall of said tank.

3. The apparatus of claim 2 wherein the lower edges of said plates lie substantially in a common horizontal plane.

4. The apparatus of claim 3 wherein said lower edges of said plates are substantially equiangularly spaced apart in said common plane and said plates are inclined at substantially equal angles relatively to said axis.

5. The apparatus of claim 4 wherein each of said plates is of substantially triangular configuration.

6. The combination of claim 5 wherein said vacuum tank includes an interior vertical wall surface of substantially cylindrical configuration and said outer end of each plate engages said interior wall and conforms to said configuration.

7. The combination of claim 1 wherein said means for depositing mud is disposed symmetrically about said axis within said tank and above said plates and directs an annular stream of mud onto said plates.

8. The combination of claim 7 wherein said means for depositing mud comprises inlet means for directing mud downwardly into said tank along said axis and a cone-shaped distributing member with the vertex thereof disposed on said axis below said inlet means and the periphery thereof disposed intermediate said axis and the interior wall of said tank so that mud introduced into said tank is received on said distributing member adjacent the vertex thereof and is distributed by said distributing member to flow from the periphery thereof as an annular stream onto said plates.

9. The apparatus of claim 1 wherein said means for drawing a vacuum comprises:
    a pump for establishing a flow of a carrier fluid;
    a nozzle housing including a chamber and a nozzle connected to said pump for receiving said flow of carrier fluid to project a carrier fluid jet through said chamber, said jet reducing the pressure within said chamber in a direction transverse to that of the jet; and
    conduit means communicating with said chamber and said tank and disposed transversely to the direction of the jet projected by said nozzle.

10. The combination of claim 9 wherein said vacuum drawing means further comprises:
    a reservoir for said carrier fluid having inlet and outlet means;
    means connecting said pump to said reservoir for withdrawing carrier fluid to establish said flow thereof; and
    a return conduit connecting said nozzle housing to said inlet of said reservoir and communicating with said chamber of said nozzle housing to receive said carrier fluid jet and to return the carrier fluid to the reservoir, said return conduit including a constriction intermediate the ends thereof to produce a Venturi effect operating on the carrier fluid received from the jet, the gases removed from said mud to be degassed passing into said chamber in response to the reduced pressure therein and being entrained in said carrier fluid jet and carried by said carrier fluid through said return conduit to said reservoir; and said reservoir further including means for removing gases from said reservoir.

11. An apparatus for degassing drilling mud for use in a drilling mud recirculation system said apparatus comprising:

a vacuum tank having a vertical axis, means operatively connected to said tank for drawing a vacuum from said tank to effect separation of entrapped gas from the drilling mud, baffle means mounted in said tank, said baffle means comprising a plurality of radially disposed baffle plates mounted in said tank, said plates being inclined relative to the horizontal to define upper and lower edges and surfaces, said plates having their respective lower edges circumferentially spaced from each other, each plate having its upper edge vertically spaced from and overlapping the lower edge of its adjacent plate, means mounted in said tank and operatively connected to said recirculation system for depositing said mud onto the upper surfaces of said plates so that said mud to be degassed flows by gravity down said upper surfaces and falls as a plurality of thin generally radial curtains of mud from the lower edges of said plates, and outlet means in said tank and operatively connected to said recirculation system for discharge of degassed drilling mud from said tank back to the recirculation system.

References Cited

UNITED STATES PATENTS

| | | | |
|---|---|---|---|
| 2,127,571 | 8/1938 | Pardee | 55—468 X |
| 2,808,897 | 10/1957 | Reinsch et al. | 55—450 X |
| 3,241,295 | 3/1966 | Griffin et al. | 55—193 X |
| 3,271,929 | 9/1966 | Bowden et al. | 55—203 X |

SAMIH N. ZAHARNA, *Primary Examiner.*

REUBEN FRIEDMAN, *Examiner.*

R. W. BURKS, *Assistant Examiner.*